No. 832,391. PATENTED OCT. 2, 1906.
B. KREITH.
DRAFT HARNESS FOR CAVALRY AND OTHER HORSES.
APPLICATION FILED AUG. 28, 1905.
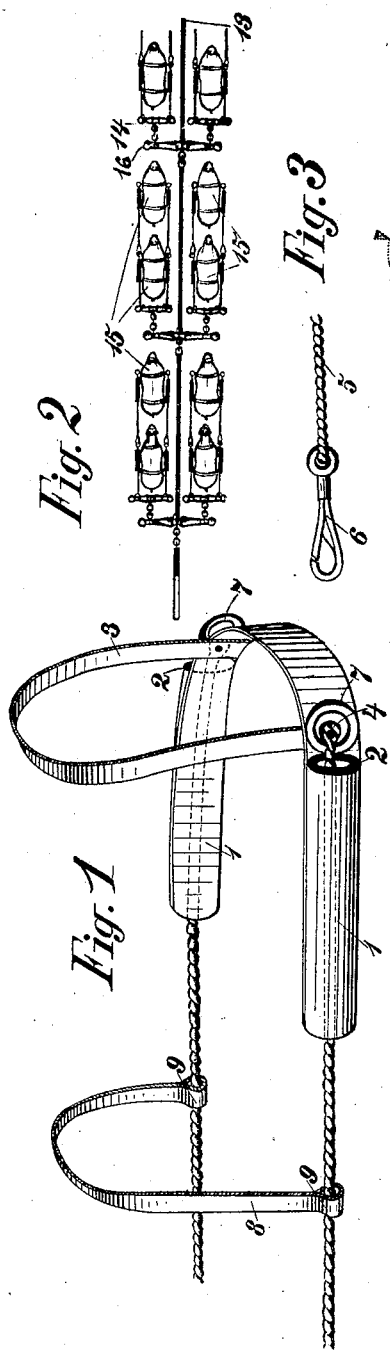
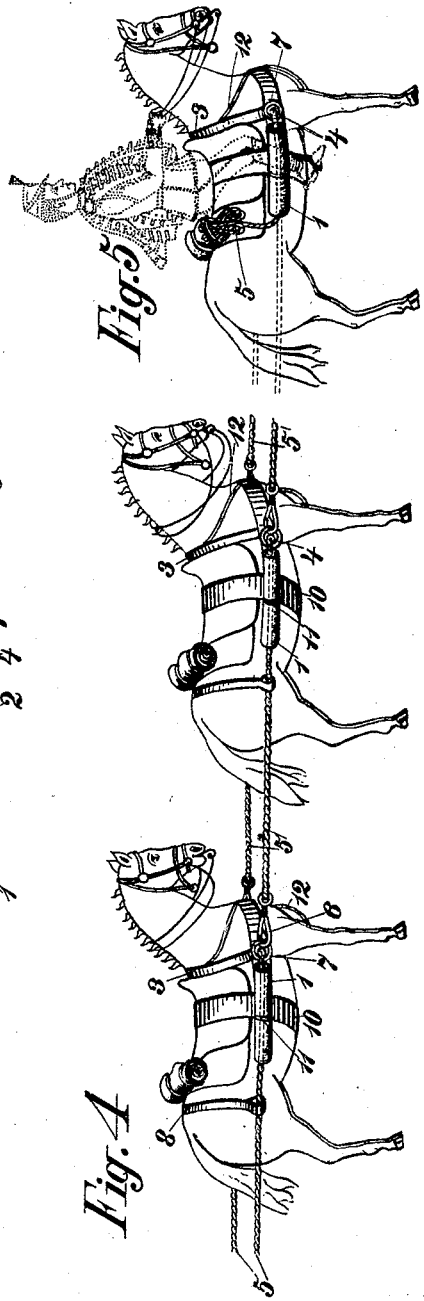
Witnesses:—
Inventor:—
Count Bela Kreith
by Eustace W. Hopkins
Atty.

UNITED STATES PATENT OFFICE.

BELA KREITH, OF BUDAPEST, AUSTRIA-HUNGARY.

DRAFT-HARNESS FOR CAVALRY AND OTHER HORSES.

No. 832,391.     Specification of Letters Patent.     Patented Oct. 2, 1906.

Application filed August 28, 1905. Serial No. 276,069.

*To all whom it may concern:*

Be it known that I, BELA KREITH, journalist, a subject of the Emperor of Austria-Hungary, residing at V Véső street 7, Budapest, in the Empire of Austria-Hungary, have invented certain new and useful Improvements in Draft-Harness for Cavalry and other Horses, of which the following is a full, clear, and exact description.

The present invention consists of certain improvements in draft-harness for cavalry and other horses and of the details of construction hereinafter set forth, and particularly pointed out in the claims.

In order to render the present specification easily intelligible, reference is had to the accompanying drawings, in which similar numerals of reference denote similar parts throughout the several views.

Figure 1 is a perspective view of the harness; Fig. 2, a diagram showing the combination of several pairs of horses to form a team; Fig. 3, a detail view of the end of a trace; Fig. 4, a view of a pair of horses harnessed together; and Fig. 5, a view of a cavalry-horse, showing the harness packed on the same when not in use.

The primary object of the present invention is to provide a light harness which may always be carried by a cavalry-horse and may be easily unpacked in case of need, so that a team may be readily composed of ordinary cavalry-horses and harnessed to a gun-carriage or other wagon.

The harness illustrated consists of a breast-belt 1, advantageously provided with sleeves 2 at each side, through which the traces 5 are passed and secured to a bolt 4 on the breast-belt, which bolt may also serve for securing the neck-strap 3, which serves to hold the breast-belt at the proper height. At the front end of the trace an eye is provided for the reception of a ring 7 at each side of the breast-belt, and a hip-strap 8 is mounted by means of a loop 9 on the two traces 5, the rear end of each trace being provided with a swivel-hook 6, as shown at Fig. 3.

The harness is placed on the cavalry-horse, as shown in Fig. 5, and the ends of the traces rolled up and packed on the back. In connecting up the horses to form a team the traces are unpacked and the ends swiveled to the rings 7 of the breast-belt of the rear horse.

If a very strong team is necessary, the traces would not be strong enough to stand the strain, and in this case auxiliary stout trace rope or leather sections 13, Fig. 2, are connected in suitable manner to the wagon-pole, and at suitable distances apart these sections carry cross-poles 16, to which are pivoted trace-poles 14, so that each of the latter would have two horses attached to it.

The neck-strap 3 might be omitted and the breast-belt attached in suitable manner to the front fork 12 of the saddle-straps, or the sides of the breast-belt might be attached, as shown at Fig. 4, to the saddle-girths 10 at 11. It will also be obvious that instead of the swivels 6 being on the ends of the traces they might be attached to the bolts 4, and the rings 7 might be attached to the ends of the traces, or buckles might be employed instead of the swivels or hooks 6. The whole harness might, if desired, be connected up by buckles or in any other suitable manner.

I claim as my invention—

1. A draft-harness consisting of a breast-belt, sleeves at each side thereof traces passing through and lying in said sleeves, a neck-strap and bolts to attach each end of the same to the breast-collar, an eye at the front end of each trace to receive a ring or swivel-hook, the said front trace ends being secured by the neck-strap bolts and a hook or ring at the ends of the traces to engage the hook or ring of the breast-belt of the rear harness substantially as described.

2. A draft-harness consisting of a breast-belt having a neck-strap attached thereto, traces attached at each side of the said belt, a single bolt at each side of the belt to attach the neck-strap and the trace, a ring attached to the forward end of each trace, a hip-strap adapted to slide on the said traces and a hook at the rear ends of the trace.

In testimony whereof I affix my signature in the presence of two witnesses.

BELA KREITH.

Witnesses:
    JULIUS MÁRTRAY,
    CHARLES E. BALTZO.